Patented May 13, 1930

1,758,365

UNITED STATES PATENT OFFICE

GEORG KALISCHER, OF FRANKFORT-ON-THE-MAIN, HEINRICH SALKOWSKI, OF MAIN-KUR, NEAR FRANKFORT-ON-THE-MAIN, AND FRITZ FRISTER, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR PRODUCING SULPHURIZED VAT DYESTUFFS CONTAINING CHLORINE

No Drawing. Application filed September 15, 1927, Serial No. 219,805, and in Germany October 1, 1926.

The present invention relates to an improved process for producing sulphurized vat dyestuffs of the anthracene series containing chlorine.

In German Patent 247,416 a process is described for the production of a brownish red vat dyestuff by heating anthracene with disulphurdichloride at temperatures not considerably exceeding 220°. This dyestuff has a great technical value since it has been found that when alkylating its dyeings on the fiber according to the process described in U. S. A. Patent 1,489,225 blue shades of an unequaled fastness, particularly to kier boiling, are obtained. The process for the manufacture of the dyestuff as described in German Patent 247,416 is lacking in yield and purity of the product obtained.

We have now succeeded in discovering an improved process which permits the manufacture of the dyestuff in an excellent yield and in an almost pure state. The chief improvement consists in the addition of a suitable catalyst to the reaction mass. As such may be mentioned: iodine, ferric chloride, aluminium chloride, tungstic acid, antimony or pentachloride of antimony and similarly acting metallic materials.

The effect of the catalyst is particularly favorable when carrying out the process in the presence of a suitable diluent of a higher boiling point, which is indifferent to disulphurdichloride, such as trichlorobenzene, tetrachlorobenzene, polychlornaphthalenes or a similar diluent boiling above 200°. Molten sulphur may also advantageously be used as the diluent. In this case the disulphurdichloride necessary for the reaction may be produced in situ by allowing a slow current of chlorine to pass into the molten mixture of anthracene and sulphur.

Besides the above mentioned favorable effect as regards yield and purity of the dyestuff produced, the addition of a catalyst increases the reactivity of the disulphurdichloride to such a degree that with equal good results as the anthracene itself, its suitably halogenated, sulphurized and halogen and sulphur containing derivatives may be used as starting materials. Some characteristic compounds are hereinafter mentioned: the chloro- and bromo-substitution products of anthracene as 1.8- and 9.10-dichloroanthracene, 2.9.10-trichloroanthracene and 1.3.9.10-tetrachloroanthracene, 9.10-dibromo- and 2.9.10-tribromoanthracene, further sulphurized derivatives, in which the anthracene nucleus may be further substituted by halogens, containing sulphur in form of mercaptane-, sulfide-, disulfide- and thioether-groups. All these compounds may be used as starting materials and yield, when subjected to our process, the same final product in a satisfactory quantity. They are therefore in this process equivalents of anthracene and we have included them in the following claims under the term "anthracene compound of the general formula $C_{14} X_{10}$, wherein the X's mean hydrogen atoms, one or more of which may be replaced by halogen or a sulphur-containing monovalent residue, such as mercaptane-, sulfide-, disulfide- and thioether-groups."

Furthermore, by modifying the temperature of the reaction and the quantity of the disulphurdichloride according to the specific action of the catalyst used, (as specified in the following examples) the process of the reaction can be carried out in several phases and specific new intermediates can be isolated, which by the further treatment with disulphurdichloride produce the final dyestuff in an excellent purity and which are valuable starting materials for technical purposes.

In order to further illustrate our invention the following examples are given, the parts being by weight and all temperatures in centigrade degrees, but it is understood that our invention is not limited to the particular products or reacting conditions mentioned therein.

Example 1

A mixture of 10 kg. of anthracene, 120 kg. of trichlorobenzene, 40 kg. of disulphurdichloride and 0.3 kg. of iodine is slowly heated to boiling in a vessel provided with a reflux condenser and kept boiling for about 24 hours. The reaction mixture is allowed to cool down to about 100° C. and the dyestuff which separates in the form of crystals is filtered off. It possesses properties similar to the dyestuff described in German Patent 247,416, however, due to its high degree of purity it yields dyeings of a particularly valuable blue shade, when subjected to an after-treatment according to the process, described in U. S. A. Patent No. 1,489,225.

*Example 2*

A mixture of 10 kg. of 1.8-dichloroanthracene, 30 kg. of disulphurdichloride, 50 kg. of trichlorobenzene and 100–150 kg. of sulphur with the addition of 0.5 kg. iodine is heated for about 10 hours to 220–230° C. The mass is filtered off while hot, and the dyestuff remaining on the filter in the form of violet-brown needles is washed with hot chlorobenzene. The dyestuff obtained dissolves in sulphuric acid with a brownish yellow color. It forms with alkaline hydrosulfite a violet-blue vat and dyes cotton therefrom reddish brown shades.

*Example 3*

A mixture of 10 kg. of anthracene, 15 kg. of disulphurdichloride, 150 kg. of sulphur and 0.3 kg. aluminium chloride is heated for about 30 hours in a vessel provided with a reflux condenser and a suitable heating bath, to about 235° C. After diluting the melt with disulphurdichloride the separated dyestuff is filtered while hot and freed from the still adhering sulphur, by extracting it with a suitable solvent in the heat. It corresponds in its properties to the dyestuff obtained according to Example 1.

*Example 4*

In a suitable vessel a mixture of 100 kg. of anthracene and 1500 kg. of sulphur is heated to about 150° C. and after adding 2 kg. iodine, a slow current of chlorine is passed through the homogeneous molten mass. When the first reaction, which manifests itself by a vivacious evolution of hydrochloric acid has ceased, the reaction mixture is heated to about 220–230° C., while further introducing chlorine and taking care that the formed disulphur dichloride is immediately consumed in situ. After about 24 hours the introduction of the current of chlorine is interrupted and the disulphur dichloride which may be present removed, for instance, by blowing in a warm current of air. When cold, the mass is ground and in order to remove the excess of sulphur treated as usual, for instance with a solution of monochlorobenzene or sodium sulfide.

By substituting for anthracene one of its derivatives as, for instance 9.10-dichloroanthracene or 2.9.10-trichloro- or 1.3.9.10-tetrachloroanthracene, analogous products are obtainable.

*Example 5*

A mixture of 10 kg. of anthryl-9-disulfide (Friedländer, Ber. der deutschen Chem. Ges. vol. 55, page 3969 ff.), 100 kg. of trichlorobenzene, 40 kg. of disulphurdichloride and of 0.5 kg. of iodine is heated for about 24 hours to about 225°. The product of reaction is filtered off in the heat and treated as described in the foregoing examples. The dyestuff thus obtained in crystalline form corresponds in its properties with the dyestuff described in Example 1.

When using instead of anthryl-9-disulfide the corresponding amount of 9-anthryl-dithiochloride or of 9-anthrylmercaptane or of the methylether thereof (cf. Friedländer l. c.) an equivalent dyestuff is obtainable.

*Example 6*

100 kg. of anthracene are gradually entered into 300 kg. of molten sulphur heated to about 200° C., the molten mass being maintained at a temperature of 225–230° for about 4 hours. When cold, the mass is treated several times with a hot aqueous solution of sodium sulfide until the solution used for the extraction no longer turns brown. From the solution thus obtained containing sulphur and the new compound the latter can be separated in the usual manner for instance by the cautious addition of an acid or a bisulfite. The new compound is a sulphurized anthracene derivative containing probably at least one S-H-group in its molecule. When dry, it is a brown powder, easily soluble in aqueous sodium sulfide solutions with a brown color. The solution in sulphuric acid is brown and changes to brownish black by heating.

10 kg. of the product thus obtained are heated for about 8 hours at about 220° C. with 25 kg. of disulphurdichloride and 50 kg. of trichlorobenzene. Hereby the properties of the product are completely changed. The dyestuff thus obtained corresponds in its properties to the product obtained according to Example 1.

A product dyeing a rather more olive brown shade is formed by reducing the amount of disulphur dichloride to 5 kg. for instance.

*Example 7*

A solution of 10 kg. of 9.10-dichloroanthracene in 40 kg. of disulphur dichloride with the addition of 0.5 kg. pentachloride of antimony is heated for 2–3 hours to 140–150° C., a vivacious evolution of hydrochloric acid taking place. On cooling, a compound crystallizes from the solution in the shape of yellowish needles which by boiling with glacial acetic acid and recrystallizing from toluene can be freed from the parent material and higher chlorinated products of anthracene that may be contained therein. The compound which contains chlorine and sulphur has a melting point of about 245° C. and dissolves in an oleum of 20% strength with an intense violet-blue color. The new compound is transformed into the dyestuff by a further treatment in the disulphur dichloride according to the processes described in Examples 1-3.

*Example 8*

By carrying out the action of disulphurdichloride on 9.10-dichloroanthracene as described in Example 6 at a more elevated temperature (for instance at about 180-200° C.), preferably with an addition of trichlorobenzene, another intermediate body separates from the reaction mass which dissolves in sulphuric acid with an orange red color of an intense scarlet fluorescence. This compound can also be transformed into the dyestuff by one of the above processes.

*Example 9*

10 kg. of the very finely powdered dyestuff produced according to Example 1 of U. S. A. Patent 992,282 or the corresponding quantity of the raw melt are heated for about 6 hours to 220° C. with 25 kg. of disulphur dichloride and 60 kg. of trichlorobenzene, advantageously with the addition of 0.2 kg. iodine. The dyestuff thus obtained in a crystalline form is filtered off while hot and freed from undesired by-products by extraction with boiling monochlorobenzene. The dyestuff thus obtained is entirely different from the dyestuff used as starting material and corresponds in its properties to the product obtained according to Example 1.

We claim:

1. Improved process for producing sulphurized vat dystuffs containing chlorine, which process comprises treating at temperatures from about 150 to about 250° an anthracene compound of the general formula $C_{14}X_{10}$, wherein the X's mean hydrogen atoms, of which one or more may be replaced by halogen or a sulphur containing monovalent residue, with disulphurdichloride with addition of a halogen carrier.

2. Improved process for producing sulphurized vat dyestuffs containing chlorine, which process comprises treating at temperatures from about 150 to 250° an anthracene compound of the general formula $C_{14}X_{10}$, wherein the X's mean hydrogen atoms, of which one or more may be replaced by halogen or a sulphur containing monovalent residue, with disulphurdichloride with addition of a halogen carrier in presence of a diluent indifferent to disulphurdichloride.

3. Improved process for producing sulphurized vat dyestuffs containing chlorine, which process comprises treating at temperatures from about 150 to 250° an anthracene compound of the general formula $C_{14}X_{10}$, wherein the X's mean hydrogen atoms, of which one or more may be replaced by halogen or a sulphur containing monovalent residue, with disulphurdichloride with addition of a halogen carrier in presence of a diluent indifferent to disulphurdichloride and boiling above about 200°.

4. Improved process for producing sulphurized vat dyestuffs containing chlorine, which process comprises treating at temperatures from about 150 to 250° an anthracene compound of the general formula $C_{14}X_{10}$, wherein the X's mean hydrogen atoms, of which one or more may be replaced by halogen or a sulphur containing monovalent residue, with disulphurdichloride with addition of a halogen carrier in presence of molten sulphur as diluent.

5. Improved process for producing sulphurized vat dyestuffs containing chlorine, which process comprises treating at temperatures from about 150 to 230° an anthracene compound of the general formula $C_{14}X_{10}$, wherein the X's mean hydrogen atoms, of which one or more may be replaced by halogen or a sulphur containing monovalent residue, with disulphurdichloride produced in situ with addition of a halogen carrier in presence of molten sulphur as diluent.

6. Improved process for producing sulphurized vat dyestuffs containing chlorine, which process comprises introducing chlorine at temperatures from about 150 to about 230° with addition of a halogen carrier into a mixture of sulphur and an anthracene compound of the general formula $C_{14}X_{10}$, wherein the X's mean hydrogen atoms, of which one or more may be replaced by halogen or a sulphur containing monovalent residue.

7. Improved process for producing a sulphurized vat dyestuff containing chlorine, which process comprises treating at temperatures from about 200-230° anthracene with molten sulphur, separating the new product of the reaction mass and transforming it into the vat dyestuff by heating at temperatures of about 180 to 250° with disulphur dichloride with addition of a halogen carrier.

In testimony whereof, we affix our signatures.

GEORG KALISCHER.
HEINRICH SALKOWSKI.
FRITZ FRISTER.